United States Patent [19]

Wan et al.

[11] Patent Number: 5,550,093
[45] Date of Patent: Aug. 27, 1996

[54] PREPARATION OF SUPPORTED GOLD CATALYSTS FOR CARBON MONOXIDE OXIDATION

[75] Inventors: Ben-Zu Wan, Taipei; Yih-Ming Kang, Taipei Hsien, both of Taiwan

[73] Assignee: National Science Council, Taiwan

[21] Appl. No.: 490,530

[22] Filed: Jun. 14, 1995

[51] Int. Cl.$^6$ .................................... B01J 23/02
[52] U.S. Cl. ................ 502/74; 502/78; 502/79; 502/344
[58] Field of Search .............. 502/344, 73, 74, 502/77, 78, 79

[56] References Cited

U.S. PATENT DOCUMENTS 4,608,356  8/1986  Buss et al. ................ 502/66
4,882,307  11/1989  Tsao ........................ 502/66

FOREIGN PATENT DOCUMENTS 937748  9/1963  United Kingdom.

Primary Examiner—Michael L. Lewis
Assistant Examiner—Thomas G. Dunn, Jr.
Attorney, Agent, or Firm—Birch, Stewart, Kolasch & Birch, LLP

[57] ABSTRACT

This invention relates to the preparation of supported gold catalysts for carbon monoxide oxidation. The supported gold catalysts were obtained by cation exchange of gold ion into ion exchangeable supports. After being heated in a stream of humidified inert gas at an elevated temperature, the resultant catalysts possess not only high catalytic activities for carbon monoxide oxidation but also good water-durability.

11 Claims, No Drawings

PREPARATION OF SUPPORTED GOLD CATALYSTS FOR CARBON MONOXIDE OXIDATION

BACKGROUND OF THE INVENTION

1. Field of the Invention

This invention relates to the preparation of catalysts, and more particularly to a method of preparing a supported gold catalyst for carbon monoxide oxidation by using an ion exchange scheme.

2. Description of the Prior Art

The use of catalysts for low-temperature carbon monoxide (CO) oxidation is of importance in environmental protection, industrial processes, and some instruments. In the past, gold (Au) has been less frequently considered as a catalyst material due to its chemical inertness. An upsurge of interest in gold as a catalyst material was aroused by the work of Haruta et al., i.e. Japanese Patent JP 60 238,148 entitled "Gold-based oxide catalyst for catalytic combustion of fuel gases". They reported that $Au/Fe_2O_3$, $Au/Co_3O_4$ and $Au/NiO$, which were prepared by a coprecipitation method, were effective in promoting the oxidation of carbon monoxide even at a temperature as low as $-70°$ C. By such a coprecipitation method, the surface areas of catalysts were low and the gold loadings were usually larger than 10 wt. %. As a result, significant amount of gold probably was buried inside the host metal oxide particles and could not be used for CO oxidation. Furthermore, these gold-host oxide catalysts prepared by precipitation method should be supported on appropriate carriers before being practically used. Therefore, an improvement by supporting gold and iron oxide on various carriers has been reported by Haruta et al., i.e. Japanese Patent JP 01 94,945 entitled "Catalysts from gold ultrafine particle-loaded metal oxide fixed on supports and manufacture thereof". However, there is an ever present need to develop new, water-durable and effective CO oxidation catalyst compositions and/or improved processes for preparing effective CO oxidation catalyst compositions.

SUMMARY OF THE INVENTION

It is therefore an object of the present invention to provide a method of preparing a gold-based catalyst for carbon monoxide oxidation, capable of improving the efficiency of utility of gold.

It is another object of the present invention to provide a method of preparing a gold-based catalyst for carbon monoxide oxidation, suitable for use either in the presence or absence of water vapor.

In accordance with one object of the present invention, a novel method of preparing a supported gold catalyst for carbon monoxide oxidation is achieved. The method generally comprises the steps of:

(a) adding an ion-exchangeable support into a stirring solution of chloroauric acid to carry out a cation exchange procedure;

(b) performing a filtration of the solution to obtain a supported gold catalyst and leave the remaining part of the solution as a filtrate;

(c) washing and drying the supported gold catalyst obtained in step (b); and (d) heating the supported gold catalyst obtained in step (c) in a stream of humidified inert gas at a temperature of between $200°$ C. to $800°$ C.

In accordance with another object of the present invention, iron or iron and species selected from the group consisting of cerium, alkali, and alkaline earth species is added on the ion-exchangeable support by ion exchange or impregnation. This can be done either before or after the cation exchange procedure. Also, these species even can be added on the ion-exchangeable support at the period of performing the cation exchange procedure.

Moreover, in accordance with the preferred embodiments of the present invention, the solution of chloroauric acid is heated to a temperature of between $40°$ C. to $90°$ C. to improve the efficiency of the cation exchange procedure. Besides, the addition of a basic compound of hydroxide or carbonate into the solution of chloroauric acid to keep the pH of the filtrate in the range of between 5 to 7 can also improve the efficiency of the cation exchange procedure.

DETAILED DESCRIPTION OF THE PREFERRED EMBODIMENTS

According to the present invention, the preparation of a supported gold catalyst for carbon monoxide oxidation is carried out by an ion exchange scheme rather than a coprecipitation method.

First, a gold contained compound, such as a chloroauric acid was dissolved in water to prepare a solution of chloroauric acid. Next, an ion-exchangeable support, such as Y-type zeolite, X-type zeolite, L-type zeolite, Mordenite-type zeolite, Omega-type zeolite, Beta-type zeolite, or amorphous silica alumina, was added into the solution of chloroauric acid with stirring to carry out a cation exchange procedure. To improve the efficiency of the cation exchange, the solution of chloroauric acid can be heated to a temperature of between $40°$ C. to $90°$ C. Moreover, the improvement can also be done by adding a basic compound of hydroxide or carbonate into the solution of chloroauric acid to keep the pH of the filtrate in the range of between 3 to 10, preferably between 5 to 7. After the cation exchange, the solid was filtered, washed and dried. Finally, the solid was activated in a stream of humidified inert gas (e.g. helium, argon, nitrogen, . . . , etc.) at a temperature of between $200°$ C. to $800°$ C. to form the catalyst particles.

To enhance the catalyst activity of gold, iron or iron and species selected from the group consisting of cerium, alkali, and alkaline earth species was added on the ion-exchangeable support, such as by ion exchange or impregnation. This can be done either before or after the cation exchange procedure. Also, this addition can be done during the cation exchange procedure. The amounts of iron, cerium, alkali, and alkaline earth species were controlled so as not to destroy the structure of the ion-exchangeable support.

The following specific examples are intended to demonstrate this invention more fully without acting as a limitation upon its scope.

EXAMPLE 1

The Gold Loading of a Catalyst Versus the Gold/Iron Loading Order Table 1 shows the comparison of the metal contents of a catalyst for various gold/iron loading orders. In this example, a Y-type zeolite was used as the ion-exchangeable support. The catalysts were prepared by adding 3 grams of Y-type zeolite into a 500 ml of solution consists of 0.125 grams of gold (Au) or 0.15 grams of iron (Fe). The Fe ion exchange was carried out at room temperature for 6 hours. The ion exchange procedures for Au or Au/Fe were carried out at about $80°$ C. for 16 hours. As can be seen in Table 1, it is shown that the Au loading of the catalyst is as high as 0.61 wt. %, the greatest of all conditions, if the Fe ion exchange is done prior to the Au ion exchange. On the other hand, if the Fe and Au ion exchange procedures are carried out concurrently, the Au loading of the catalyst is reduced 0.30 wt. %, the least one of all conditions. Furthermore, if the Au ion exchange is done prior to the Fe ion exchange, the Au loading of catalyst is reduced from 0.66 wt. % to 0.41 wt. % since a portion of the loaded gold is resuspended in solution again. Also, if the Au ion exchange is done prior to the impregnation of Fe, a portion of the gold may be overlaid by iron. Thus, the Au ion exchange is preferably carried out after the loading of Fe for obtaining the maximum utility of Au.

EXAMPLE 2

The Gold Loading of Catalyst Versus the pH Value of Filtrate

In this example, a silica alumina was used as the ion-exchangeable support. The catalyst was prepared by the following steps. First, silica alumina was impregnated with ferric oxide ($Fe_2O_3$). Next, this support was suspended in water and different amounts of sodium hydroxide (NaOH) were added to adjust the pH values. Then, chloroauric acid was added into the solution to carry out a cation exchange. As can be seen in Table 2, if the pH value of filtrate is set to be as low as 4.34, the Au loading of catalyst is low. On the other hand, if the pH value of filtrate is set to be 6.09, the Au loading of catalyst is increased. And if the pH value of filtrate is set to be as high as 7.33, the Au loading of catalyst will be reduced.

EXAMPLE 3

The pH Value of Filtrate Versus the Sodium Content of Support

In this example, a silica alumina was used as the ion-exchangeable support. The catalyst was prepared by first adding sodium hydroxide into the solution of chloroauric acid to set the pH value to about 4.5. Then, the support impregnated with ferric oxide and sodium oxide was added into the solution of chloroauric acid to carry out the cation exchange. As can be seen in Table 3, the pH value of filtrate is effected by the Na content of support. That is, the more Na content there is, the greater the pH value of filtrate that can be obtained. However, acceptable Au loading of catalyst were achieved only when the pH value of filtrate was set in a range of between 5 to 7. This is agreement with the results of example 2.

EXAMPLE 4

The Catalytic Activities of Catalysts

In this example, the catalysts which contained 0.0018 grams of Au (only about one sixth to one seventh of that in the work of Haruta et al., i.e. Chem. Lett., pp. 405–408, 1987) were activated by treating in a stream of humidified inert gas at 400° C. or 570° C. for 2 hours, and then thermally treating in a stream of inert gas at 400° C. for ½ hour. The catalytic activities of the resultant catalysts for carbon monoxide oxidation, either in the presence or absence of water vapor-, were measured in a continuous flow fixed-bed, quartz-tubular reactor at 40° C. under atmospheric pressure. During the reaction test, 32.67 ml/min. of air and 0.33 ml/min. of carbon monoxide were fed into the reactor. The concentration of water vapor, if used, was maintained at ca. 3 vol. %.

In Table 4, the loading of Fe of all catalysts was carried out by impregnation or coimpregnation (with Ce or Na) prior to the Au ion exchange. Au/Fe/Y, Au/Fe/β and Au/Fe/Mor contained 6 wt. % of Fe, where β represents β type zeolite, Mor represents Mordenite. Moreover, 11 wt. % of Fe, 15 wt. % of Ce or 5 wt. % of Na were impregnated or coimpregnated onto silica alumina support. As can be seen in Table 4, these catalysts possess not only high catalytic activities for carbon monoxide oxidation, but also good water-durability.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

TABLE 1

| Catalyst[α] | pH[β] | Au loading (wt %) | Fe loading (wt %) | loading order |
|---|---|---|---|---|
| Au, Fe-6/Y | 3.68 | 0.30 | 1.28 | concurrently |
| Au/Y | 4.79 | 0.66 | — | — |
| Fe-6/Au/Y | 4.79 | 0.41 | 1.06 | Au first |
| Fe-6/Y | — | — | 1.39 | — |
| Au/Fe-6/Y | 4.14 | 0.61 | 1.39 | Fe first |

[α]Solution concentration: a 500 ml of solution consists of 3 grams of Y-type zeolite and 0.125 grams of Au or 0.15 grams of Fe.
[β]The pH value of the filtrate after the ion exchange procedure.

TABLE 2

| Catalyst | pH[α] | Au loading (wt %) | Fe loading (wt %) |
|---|---|---|---|
| Au8/Fe/SiAl | 4.34 | 1.62 | 12 |
| Au10/Fe/SiAl | 6.09 | 3.19 | 11 |
| Au11/Fe/SiAl | 7.33 | 0.85 | 11 |

[α]The pH value of the filtrate after the ion exchange procedure.

TABLE 3

| Catalyst | pH[β] | metal loading (wt %) | | |
|---|---|---|---|---|
| | | Au | Fe | Na |
| Au/Fe10/SiAl | 4.1 | 1.7 | 8.3 | 0 |
| Au/Fe10_Na1/SiAl | 5.6 | 3.1 | 9.3 | 0.6 |
| Au/Fe10_Na3/SiAl | 7.0 | 2.4 | 9.3 | 2.4 |
| Au/Fe10_Na6/SiAl | 7.9 | 0.2 | 10.4 | 6.0 |

[α]The pH value of the filtrate after the ion exchange procedure.

TABLE 4

| Catalyst | Reactants | CO conversion (%) | |
|---|---|---|---|
| | | initial | latter (h) |
| Au/Fe/Y[α] | Air/CO | 87 | — |
| | then Air/CO/$H_2O$ | 100 | 100(17) |
| | then Air/CO | 100 | 88(25) |
| | then Air/CO/$H_2O$ | 100 | 100(25) |
| Au/Fe/Beta[α] | Air/CO | 60 | — |
| | then Air/CO/$H_2O$ | 71 | 83(18) |
| Au/Fe/Mor[α] | Air/CO | 65 | — |
| | then Air/CO/$H_2O$ | 83 | 77(17) |
| Au/Fe/SiAl[α] | Air/CO | 81 | — |
| | then Air/CO/$H_2O$ | 100 | 85(47) |
| Au/Fe,Ce/SiAl[α] | Air/CO | 89 | — |

TABLE 4-continued

| Catalyst | Reactants | CO conversion (%) initial | latter (h) |
|---|---|---|---|
| | then Air/CO/$H_2O$ | 100 | 100(20) |
| Au/Fe,Na/SiAl$^\alpha$ | Air/CO | 75 | — |
| | then Air/CO/$H_2O$ | 100 | 84(18) |
| Au/Fe/Y$^\beta$ | Air/CO | 66 | — |
| | then Air/CO/$H_2O$ | 91 | 84(13) |

$^\alpha$treated in humidified inert gas stream at 570° C.
$^\beta$treated in humidified inert gas stream at 400° C.

What is claimed is:

1. A method of preparing a supported gold catalyst for carbon monoxide oxidation, comprising the steps of:

a) adding an ion-exchangeable support into a solution of chloroauric acid to carry out a cation exchange procedure;

b) performing a filtration of said solution to obtain a exchanged gold catalyst and leave the remaining part of said solution as a filtrate;

c) washing and drying said exchanged gold catalyst; and d) heating said supported gold catalyst in a stream of humidified inert gas at a temperature between 200° C. to 800° C.

2. The method of claim 1, wherein at least one element selected from the group consisting of iron, cerium, alkali, and alkaline earth species is added on said ion-exchangeable support prior to performing the step (a).

3. The method of claim 1, wherein at least one element selected from the group consisting of iron, cerium, alkali, and alkaline earth species is added on said ion-exchangeable support while performing the step (a).

4. The method of claim 1, wherein at least one element selected from the group consisting of iron, cerium, alkali, and alkaline earth species is incorporated into said ion-exchangeable support between step(c) and step(d).

5. The method of claim 2, 3 or 4, wherein said at least one element is added on said ion-exchangeable support by ion exchange.

6. The method of claim 2 or 4, wherein said at least one element is added on said ion-exchangeable support by impregnation.

7. The method of claim 2, 3, or 4, wherein the amounts of said iron, cerium, alkali, and alkaline earth species are controlled so as not to destroy the structure of said ion-exchangeable support.

8. The method of claim 1, further comprising a step of adding a basic compound of hydroxide or carbonate into said solution of chloroauric acid, wherein the amount of said basic compound is added to keep the pH of said filtrate within the range of between 3 to 10.

9. The method of claim 8, wherein the amount of said basic compound is added to keep the pH of said filtrate in the range of between 5 to 7.

10. The method of claim 1, wherein the step (a) said solution of chloroauric acid is heated to a temperature of between 40° C. to 90° C. to improve the efficiency of said cation exchange procedure.

11. The method of claim 1, wherein said ion-exchangeable support comprises Y-type zeolite, X-type zeolite, L-type zeolite, Mordenite-type zeolite, Omega-type zeolite, Beta-type zeolite, and amorphous silica alumina.

\* \* \* \* \*